US008265169B2

(12) United States Patent
Tu

(10) Patent No.: US 8,265,169 B2
(45) Date of Patent: Sep. 11, 2012

(54) VIDEO BLOCK MEMORY READ REQUEST TRANSLATION AND TAGGING

(75) Inventor: Steven Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1655 days.

(21) Appl. No.: 11/648,715

(22) Filed: Dec. 29, 2006

(65) Prior Publication Data

US 2008/0159405 A1    Jul. 3, 2008

(51) Int. Cl.
*H04N 11/02* (2006.01)
(52) U.S. Cl. .............................. 375/240.26; 375/240.24
(58) Field of Classification Search ............... 374/240.2, 374/0.264
See application file for complete search history.

(56) References Cited

U.S. PATENT DOCUMENTS

| | | | |
|---|---|---|---|
| 5,850,230 A | 12/1998 | San et al. | |
| 5,889,949 A * | 3/1999 | Charles | 709/214 |
| 5,987,574 A | 11/1999 | Paluch | |
| 6,564,304 B1 | 5/2003 | Van Hook et al. | |
| 6,750,909 B1 | 6/2004 | Tsai | |
| 7,492,368 B1 * | 2/2009 | Nordquist et al. | 345/502 |
| 2003/0217239 A1 | 11/2003 | Jeddeloh | |

FOREIGN PATENT DOCUMENTS

| | | |
|---|---|---|
| JP | 2003178294 A | 6/2003 |
| WO | 03050655 A2 | 6/2003 |

OTHER PUBLICATIONS

"PCT International Search Report of the International Searching Authority", mailed May 13, 2008, for PCT/US2007/087678, 4pgs.
"Supplemental European Search Report", dated Jan. 7, 2010 for European Application No. 07869322.3-2202/2103118, 3pgs.
"Communication pursuant to Article 94(3) EPC: European Office Action", dated Jan. 15, 2010 for European Application No. 07 869 322.3-2202, 6pgs.
"Communication pursuant to Article 94(3) EPC: European Office Action", dated Jun. 28, 2010 for European Application No. 07 869 322.3-2202, 5pgs.

* cited by examiner

*Primary Examiner* — Sath V Perungavoor
*Assistant Examiner* — Jeffery Williams
(74) *Attorney, Agent, or Firm* — Buckley, Maschoff & Talwalkar LLC

(57) ABSTRACT

According to some embodiments, a video block memory read request may be received from a processing unit. For example, a codec may request to access a macroblock of pixel information from a memory unit. The video block memory read request may then be translated into a plurality of memory access requests.

12 Claims, 7 Drawing Sheets

2

VIDEO BLOCK MEMORY READ REQUEST TRANSLATION AND TAGGING

BACKGROUND

A media player may output moving images to a display device. For example, a media player might retrieve locally stored image information or receive a stream of image information from a media server (e.g., a content provider might transmit a stream that includes high-definition image frames to a television, a set-top box, or a digital video recorder through a cable or satellite network). In some cases, the image information is encoded to reduce the amount of data used to represent the image. For example, an image might be divided into smaller image portions, such as macroblocks, so that information encoded with respect to one image portion does not need to be repeated with respect to another image portion (e.g., because neighboring image portions may frequently have similar color and brightness characteristics).

As a result, the media player may decode encoded image information before it is presented via the display device. During such a processes, a video processing system in the media player may need to access information stored in a memory unit (e.g., to retrieve information associated with a particular macroblock). Thus improving the bandwidth and/or processing associated with these types of memory access may improve the performance of the media player.

DETAILED DESCRIPTION

Figure 1:
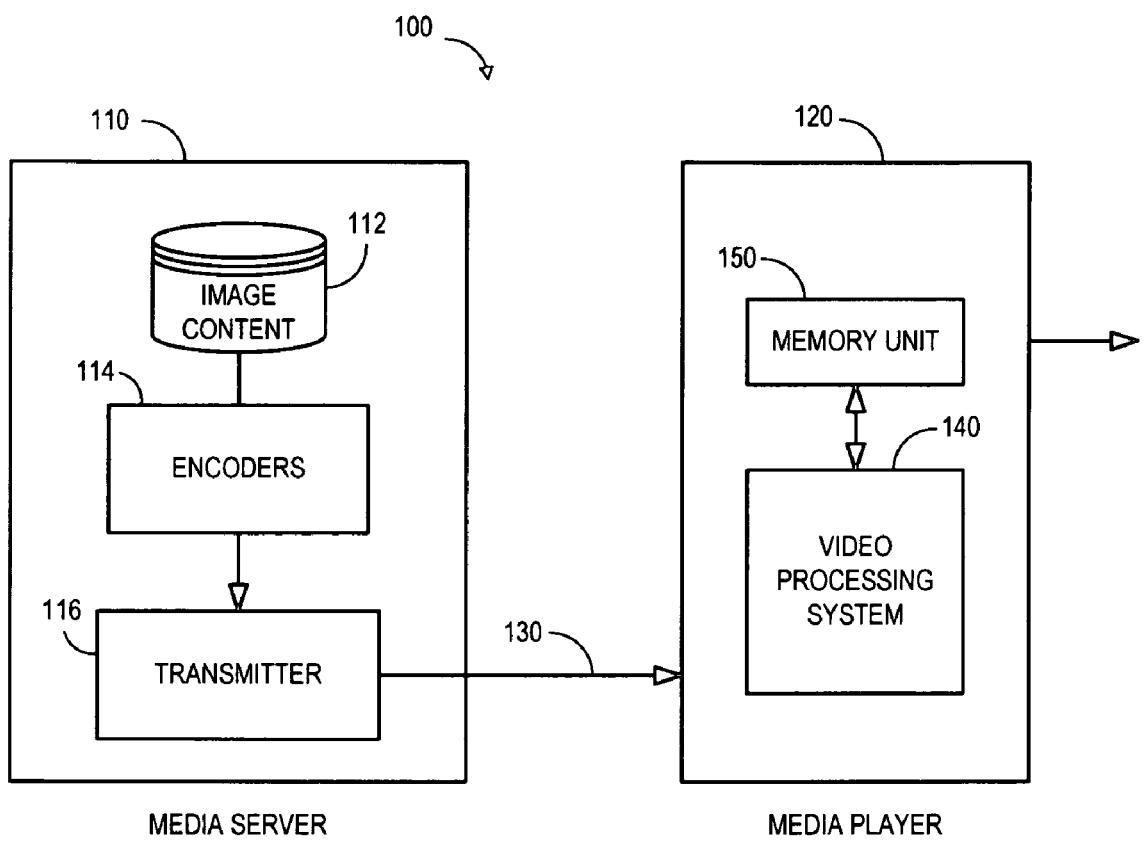
FIG. 1 is a block diagram of a media system.

A media player or similar device may receive image information, decode the information, and output a signal to a display device. For example, a Digital Video Recorder (DVR) might retrieve locally stored image information, or a set-top box might receive a stream of image information from a remote device (e.g., a content provider might transmit a stream that includes high-definition image frames to the set-top box through a cable or satellite network). FIG. 1 is a block diagram of a media system 100 including a media server 110 that provides image information to a remote media player 120 through a communication network 130.

An encoder 114 may reduce the amount of data that is used to represent image content 112 before the data is transmitted by a transmitter 116 as a stream of image information. As used herein, information may be encoded and/or decoded in accordance with any of a number of different protocols. For example, image information may be processed in connection with International Telecommunication Union-Telecommunications Standardization Sector (ITU-T) recommendation H.264 entitled "Advanced Video Coding for Generic Audio-visual Services" (2004) or the International Organization for Standardization (ISO)/International Engineering Consortium (IEC) Motion Picture Experts Group (MPEG) standard entitled "Advanced Video Coding (Part 10)" (2004). As other examples, image information may be processed in accordance with ISO/IEC document number 14496 entitled "MPEG-4 Information Technology-Coding of Audio-Visual Objects" (2001) or the MPEG2 protocol as defined by ISO/IEC document number 13818-1 entitled "Information Technology-Generic Coding of Moving Pictures and Associated Audio Information" (2000).

The media player 120 may decode encoded image information before it is presented via the display device. For example, the media player 120 may include one or more video processing systems 140 that access information stored in a memory unit 150 to decode encoded image information. The media player 120 may then present decoded image information via the display device. Some or all of the image information in the memory unit 150 may be associated with a display 200 such as the one illustrated in FIG. 2. The display 200 may include a number of rows (r1, r2 . . . ) of pixels 210 that form the image. Moreover, according to some protocols, subsets of the pixels 210 may comprise image blocks (e.g., such as a 4 by 4 macroblock 220 of pixels 210 as illustrated by the cross-hatched pixels 210 in FIG. 2).

Note that the video processing system 140 may need to exchange information with the memory unit 150. Moreover, improving the efficiency of these memory accesses may improve the performance and/or reduce the cost of producing of the media player 120.

Figure 3:
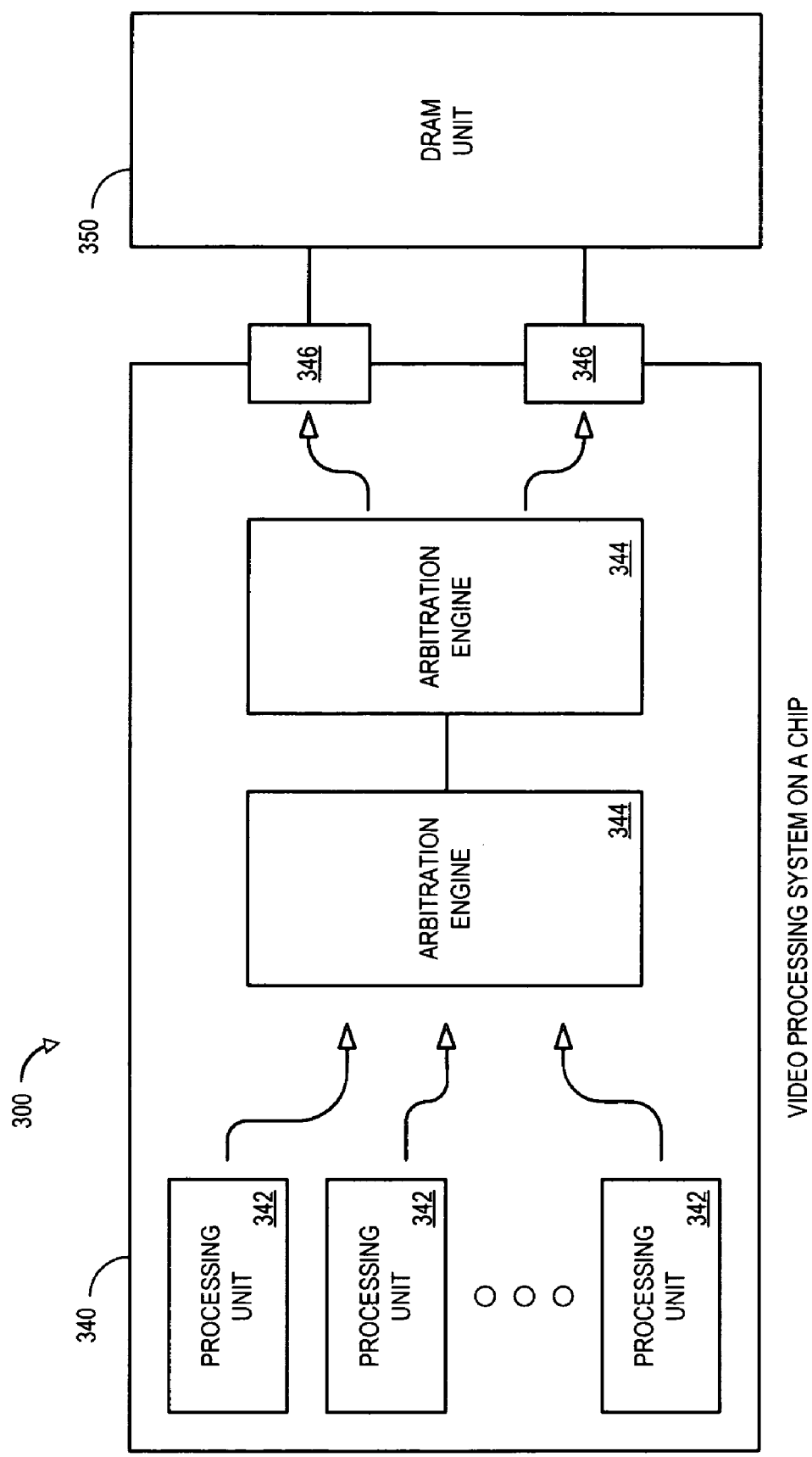
FIG. 3 is a block diagram of an apparatus according to some embodiments.

FIG. 3 is a block diagram of an apparatus 300 according to some embodiments. The apparatus 300 might be associated with, for example, a media player, a television, a Personal Computer (PC), wireless device (e.g., a home media server), a game device, a DVR, and/or a set-top box. They apparatus 300 includes a video processing System On a Chip (SOC) 340 that exchanges image information with a Dynamic Random Access Memory (DRAM) unit 350. The video processing SOC 340 includes a number of processing units 342 that may, for example, include codecs that use algorithms to decode a stream of image information.

When a processing unit 342 needs to access information from the DRAM unit 350, a memory access request may be processed through one or more levels of arbitration engines 344. The arbitration engines 344 may, for example, be associated with a bus or other data aggregation path and may coordinate memory traffic from several processing units 342. The arbitration engines 344 may then arrange for information to be accessed in the DRAM unit 350 via one or more memory controller ports 346.

Figure 2:
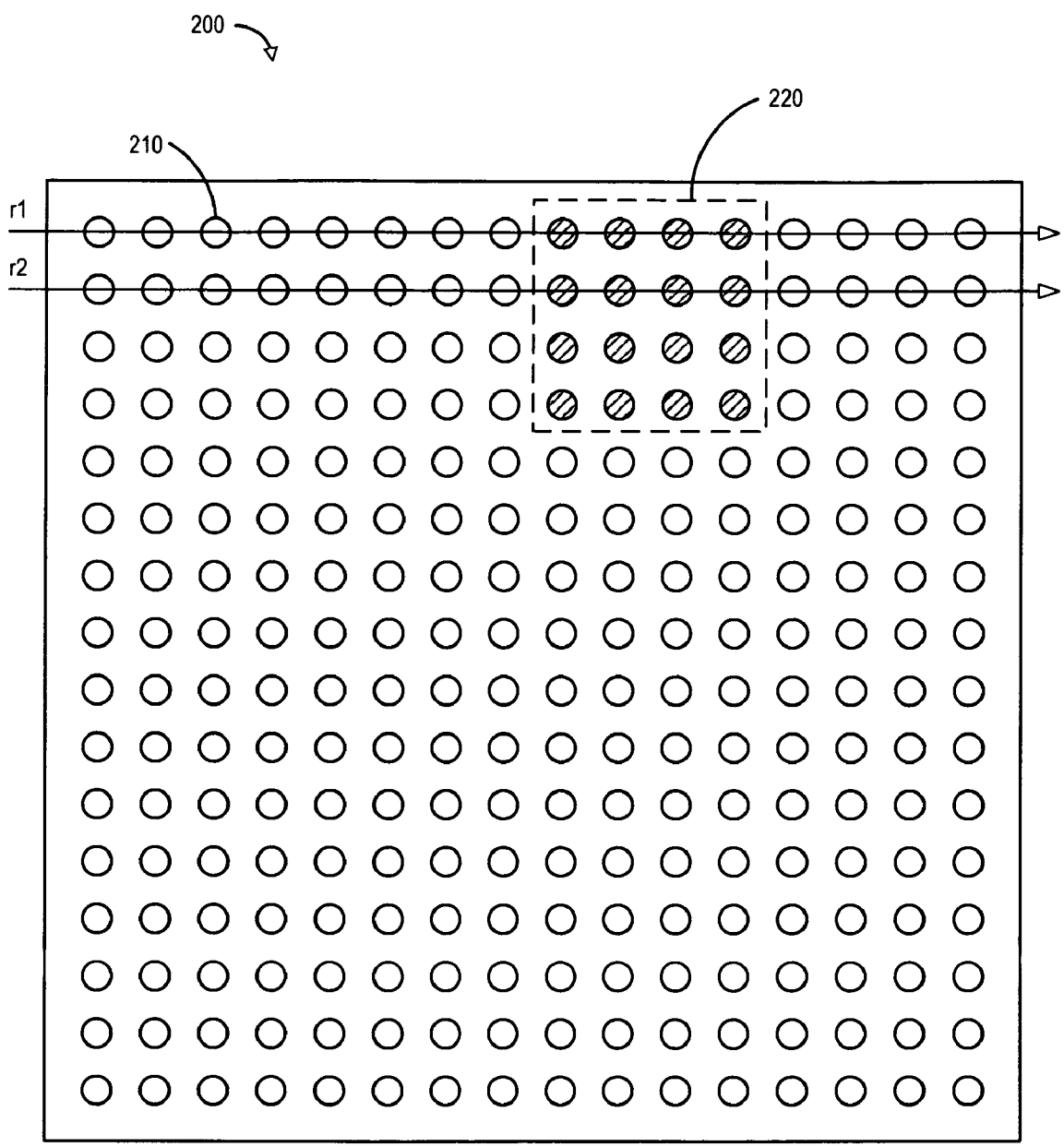
FIG. 2 illustrates a display.

Note that a processing unit 342 may need to access from the DRAM unit 250 image information associated with an image block, such as the 4 by 4 macroblock 220 illustrated in FIG. 2. Also note that the image information DRAM unit 250 may be stored in a number of different ways. Referring to FIG. 2, information about each pixel 210 might be stored in sequential addresses in the DRAM unit 250. That is, information associated with the first row r1 (starting with the left most pixel 210 and ending with the rightmost pixel 210) might be stored in the DRAM unit 250 followed by information associated with second row r2 (again starting with the left most pixel 210 and ending with the rightmost pixel 210).

Figure 4:
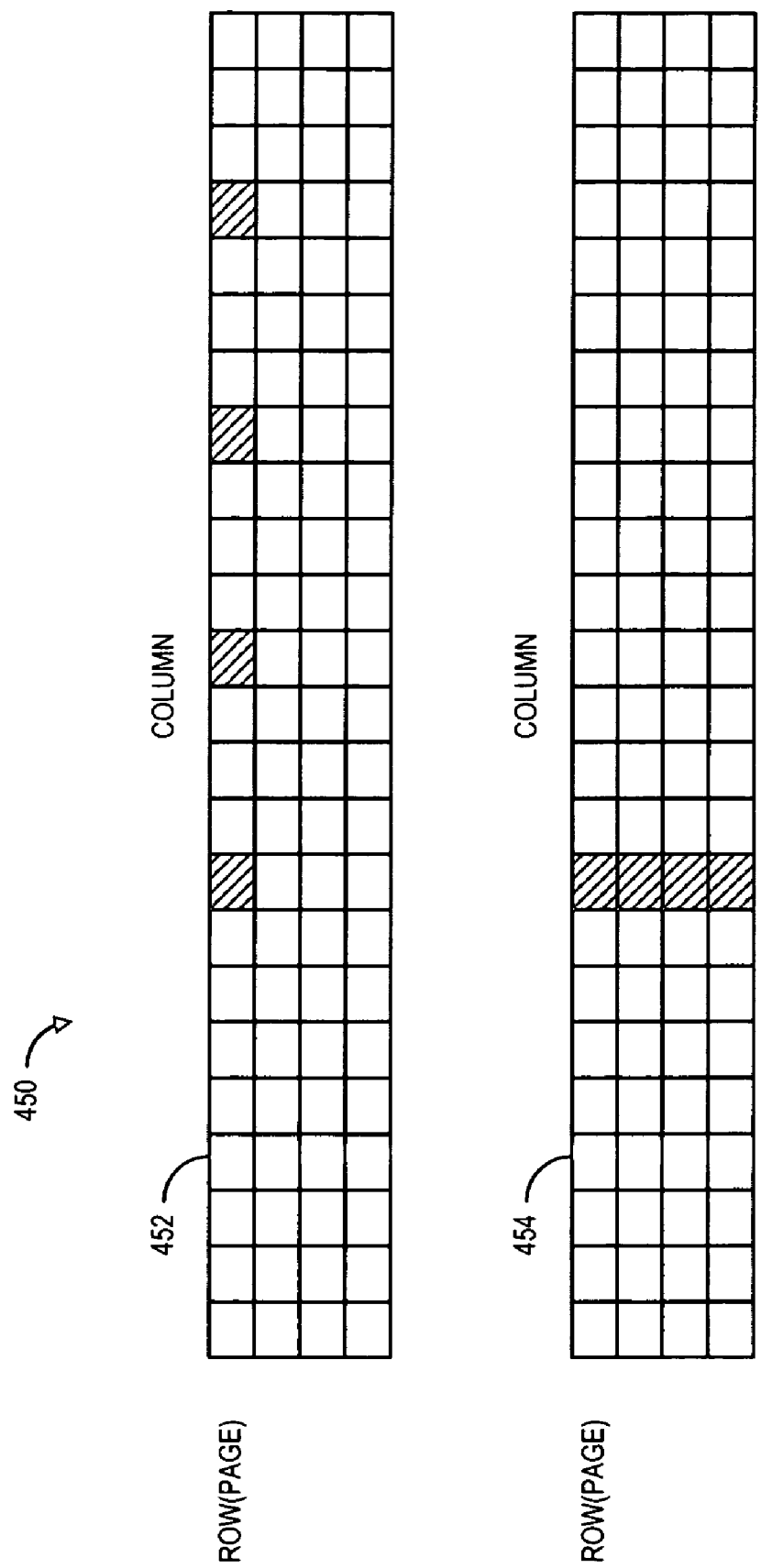
FIG. 4 illustrates memory storage arrangements according to some embodiments.

FIG. 4 illustrates memory storage arrangements in a DRAM unit 450 according to some embodiments. In the first arrangement 452, the information is stored in a series of locations represented by columns stored in row pages. The cross-hatched locations represent those associated with a requested macroblock 220. Note that in the first arrangement 452 the locations of interest are not sequential (that is, accessing a contiguous block of locations that included the cross-hatched locations would necessarily include accesses to locations that are not associated with the macroblock 220). Similarly, in the second arrangement 454 the locations of interest are associated with different row pages. As a result, a first row page would need to be opened, the first location of interest would need to be accessed, and the first row page would need to be closed. The second row page would then need to be opened before the second location of interest could be accessed. Such an approach may be an inefficient way to access the information in the DRAM unit 450.

According to some embodiments, the video processing SOC 340 of FIG. 3 may include a translator to generate a plurality of linear byte accesses in response to an image block memory request from a processing unit 342. For example, a request to access memory locations associated with the macroblock 220 of FIG. 2 might be translated into a sequence of four linear byte accesses (one for each row of pixels 210). The translator may, for example, be associated with arbitration and/or memory control path logic.

Moreover, the video processing SOC 340 may include a tagging unit to facilitate association of the linear byte accesses with each other. For example, a tag might be associated with each linear byte access such that in the subsequent data flow path the tag may be used to arbitration and memory control path logic to recognize the sequence and it's potential effect on one or more DRAM channels. For example, multiple column accesses to a DRAM page might be arranged before that page row is closed and given to another memory transaction. By grouping the associated memory accesses in this way, unnecessary page opening/closing overhead may be reduced to improve channel utilization and/or increase an effective bandwidth of the apparatus 300.

Figure 5:
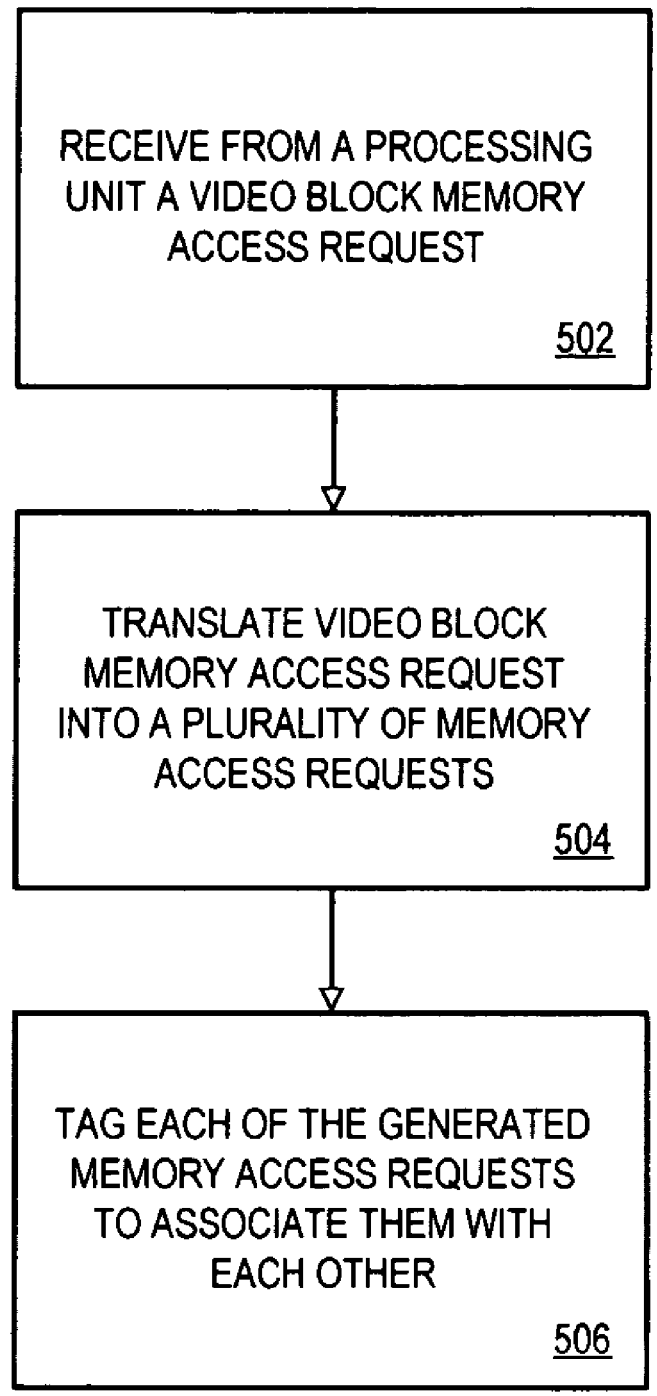
FIG. 5 is a flow diagram illustrating a method according to some embodiments.

FIG. 5 is a flow diagram illustrating a method according to some embodiments. The method may be performed, for example, by the apparatus 300 of FIG. 3. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 502, a video block memory access request is received from a processing unit. For example, a request associated with a macroblock may be received from a codec. At 504, the video block memory access request is translated into a plurality of memory access requests. For example, the plurality of generated memory access requests might represent a sequence of linear byte accesses. Moreover, when the video block is associated with a plurality of pixel rows, each linear byte access may be associated with a different pixel row.

At 506, each of the plurality of generated memory access requests may be tagged to associate the memory access requests with each other. The tag may, for example, communicate to the rest of the memory fabric an origin and/or type of memory traffic associated with the requests. In this way, subsequent handling of the requests by the memory fabric may be improved.

Figure 6:
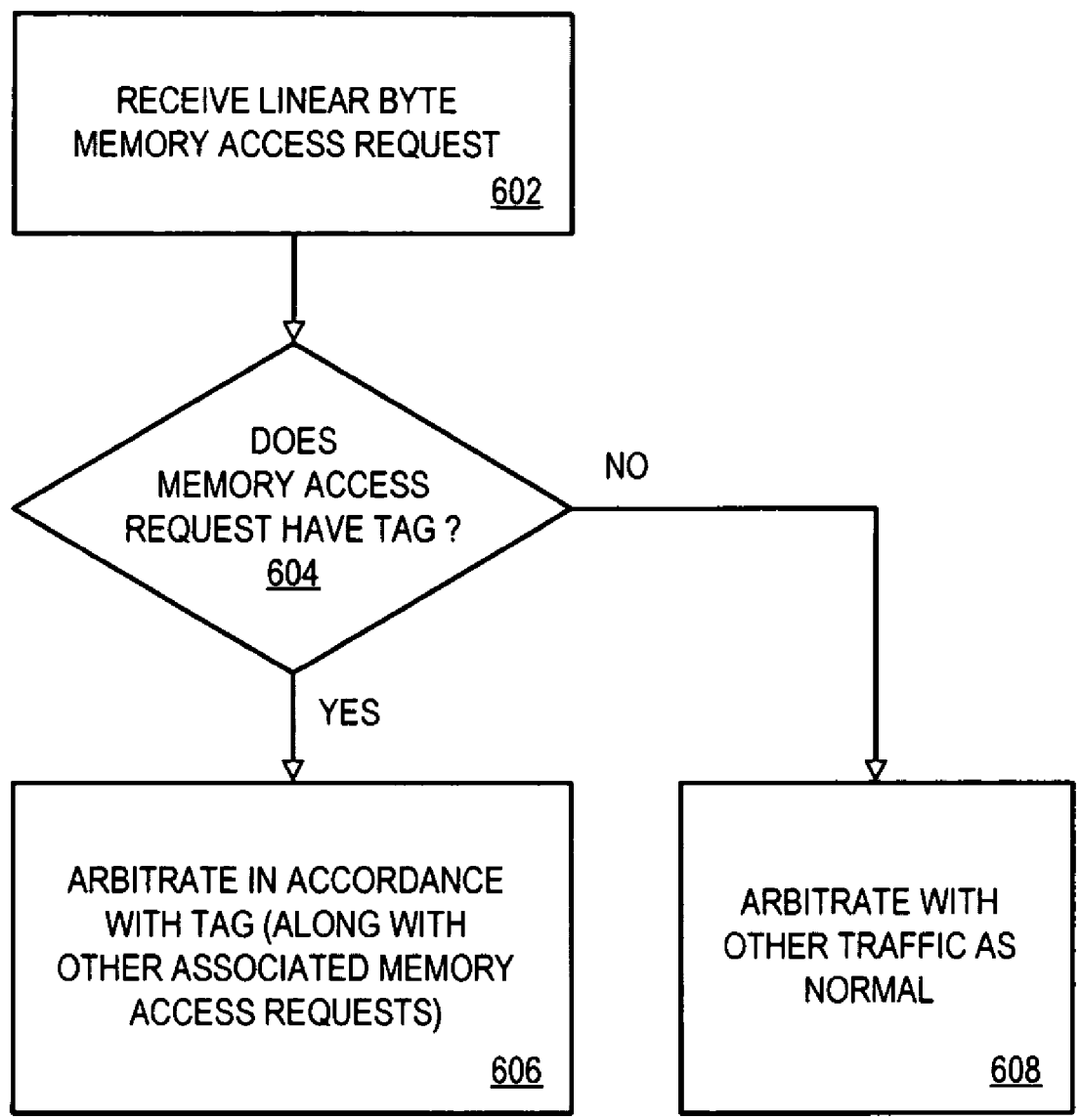
FIG. 6 is a flow diagram illustrating a method according to some embodiments.

For example, FIG. 6 is a flow diagram illustrating a method according to some embodiments. At 602, a linear byte memory access request is received. If the linear byte memory access request is not associated with a tag at 604, the request may be arbitrated with other memory traffic as normal at 608. If, however, the linear byte memory access request is associated with a tag at 604, that request may be arbitrated in accordance with the tag at 606 (e.g., along with other memory access requests associated with the same video block of image information). For example, when the video block is associated with a plurality of pixel rows, each of the tagged memory access requests being associated with a different pixel row, such arbitrating might include opening a dynamic random access memory page, accessing the memory page in accordance with one of the tagged memory access requests, and, because of at least one of the tags, again accessing the memory page in accordance with another, similarly tagged, memory access request before closing the memory page.

Figure 7:
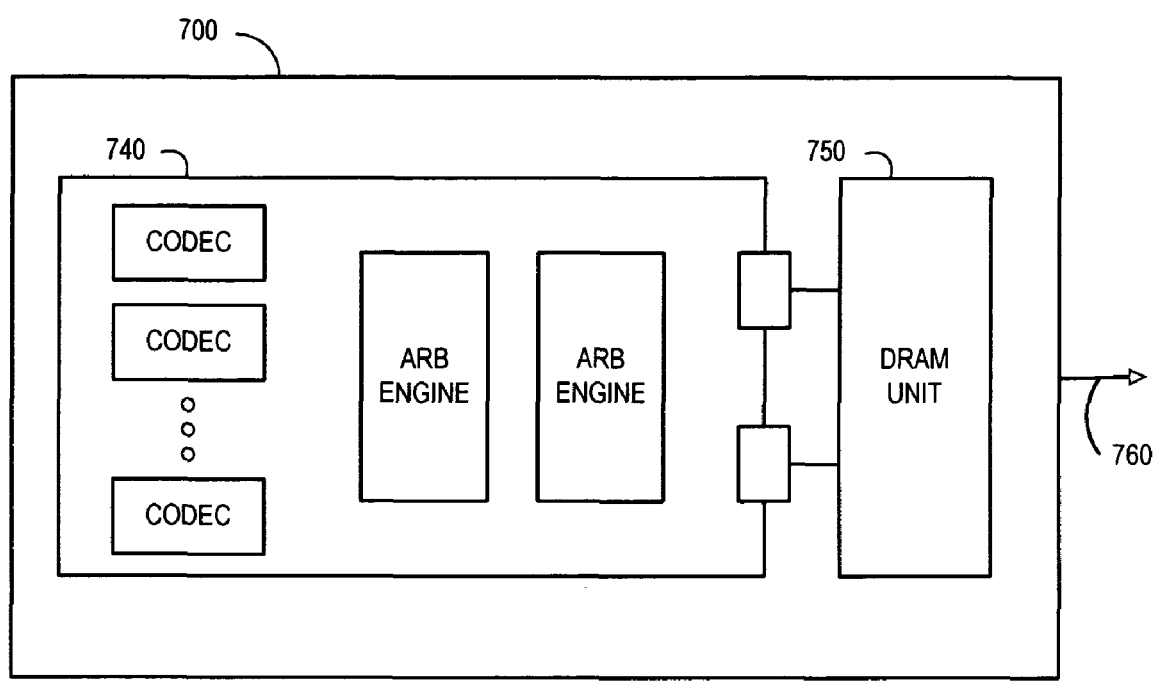
FIG. 7 is a block diagram of a system according to some embodiments.

FIG. 7 is a block diagram of a system 700 according to some embodiments. The system 700 might be associated with, for example, a digital display device, a television such as a High Definition Television (HDTV) unit, a DVR, a game console, a PC or laptop computer, a wireless device, and/or a set-top box (e.g., a cable or satellite decoder). The system 700 may operate in accordance with any of the embodiments described herein. For example, the system 700 may include a video processor 740 with codecs that (i) request information associated with an image macroblock from a DRAM unit 750 and (ii) generate image information. The video processor 740 may further include a translator to generate a plurality of linear byte accesses in response to a request from the codec and/or a tagging unit to facilitate association of the linear byte accesses with each other. According to some embodiments, the system 700 generates information that is provided to a display device via a digital output 760.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although particular image processing protocols and networks have been used herein as examples (e.g., MPEG and H.264), embodiments may be used in connection any other type of image processing protocols or networks, such as Digital Terrestrial Television Broadcasting (DTTB) and Community Access Television (CATV) systems.

Moreover, although a DRAM unit was used as an example herein, note that embodiments may be associated with any other type of memory unit including Synchronous DRAM (SDRAM) and Double Data Rate (DDR) SDRAM units. Similarly, although some embodiments have been describe with respect to media players and/or decoders, embodiments may be associated with any type of image processing system, including media servers and/or encoders.

The several embodiments described herein are solely for the purpose of illustration. Persons skilled in the art will recognize from this description other embodiments may be practiced with modifications and alterations limited only by the claims.

What is claimed is:

1. A method, comprising:
receiving from a processing unit a video block memory access request;
translating the video block memory access request into a plurality of memory access requests;
after the translating the video block memory access request into a plurality of memory access requests, tagging each of the plurality of generated memory access requests to associate the memory access requests with each other;
wherein the after the translating the video block memory access request into a plurality of memory access requests, tagging each of the plurality of generated memory access requests to associate the memory access requests with each other comprises generating a tag after said translating the video block memory access request into a plurality of memory access requests, the tag communicating an origin and a type of memory traffic associated with the memory access requests;

providing the tag to one or more levels of arbitration engines; and arbitrating, by the one or more levels of arbitration engines, the plurality of generated memory access requests along with additional memory access requests in accordance with the tags, wherein at least some of the additional memory access requests do not have a tag;

wherein the video block is associated with a plurality of pixel rows, each of the plurality of generated memory access requests being associated with a different pixel row, and said arbitrating includes:

opening a dynamic random access memory page, accessing the memory page in accordance with one of the generated plurality of memory access requests, and because of at least one of the tags, again accessing the memory page in accordance with another of the generated plurality of memory access requests before closing the memory page; and wherein the plurality of generated memory access requests comprise a sequence of linear byte accesses.

2. The method of claim 1, wherein the video block is associated with at least one of: (i) H.264 information, (ii) Motion Picture Experts Group 2 information, or (iii) Motion Picture Experts Group 4 information.

3. The method of claim 1, wherein said processing unit is associated with at least one of (i) a digital display device, (ii) a television, (iii) a digital video recorder, (iv) a game device, (v) a personal computer, (vi) a wireless device, or (vii) a set-top box.

4. An apparatus, comprising:

a processing unit to request information associated with an image macroblock from a memory unit; and a translator to generate a plurality of memory access requests in response to the request from the processing unit;

a tagging unit to tag each of the plurality of generated memory access requests to associate the memory access requests with each other after generation of the plurality of memory access requests, wherein said tag each of the plurality of generated memory access requests to associate the memory access requests with each other after generation of the plurality of memory access requests comprises generate a tag after said generation of the plurality of memory access requests, the tag communicating an origin and a type of memory traffic associated with the memory access requests;

at least one arbitration engine to receive the tag and arbitrate the plurality of generated memory access requests along with additional memory access requests in accordance with the tags, wherein at least some of the additional memory access requests do not have a tag;

wherein said arbitrate includes arrange for:

opening a dynamic random access memory page, accessing the memory page in accordance with one of the generated plurality of memory access requests, and because of at least one of the tags, again accessing the memory page in accordance with another of the generated plurality of memory access requests before closing the memory page; and wherein the plurality of generated memory access requests comprise a sequence of linear byte accesses.

5. The apparatus of claim 4, wherein the processing unit and the translator are part of a video processing system on a chip.

6. The apparatus of claim 4, wherein the processing unit is associated with a codec.

7. The apparatus of claim 4, wherein the translator is associated with arbitration and memory control path logic.

8. The apparatus of claim 4, wherein the memory unit is a dynamic random access memory unit.

9. The apparatus of claim 4, further comprising at least memory controller port.

10. An apparatus comprising:

a non-transitory computer-readable storage medium having stored thereon instructions that when executed by a machine result in the following:

receiving from a processing unit a video block memory access request, and translating the video block memory access request into a plurality of memory access requests;

after the translating the video block memory access request into a plurality of memory access requests, tagging each of the plurality of generated memory access requests to associate the memory access requests with each other;

wherein the after the translating the video block memory access request into a plurality of memory access requests, tagging each of the plurality of generated memory access requests to associate the memory access requests with each other comprises generating a tag after said translating the video block memory access request into a plurality of memory access requests, the tag communicating an origin and a type of memory traffic associated with the memory access requests;

providing the tag to one or more levels of arbitration engines; and arbitrating, by the one or more levels of arbitration engines, the plurality of generated memory access requests along with additional memory access requests in accordance with the tags, wherein at least some of the additional memory access requests do not have a tag;

wherein the video block is associated with a plurality of pixel rows, each of the plurality of generated memory access requests being associated with a different pixel row, and said arbitrating includes:

opening a dynamic random access memory page, accessing the memory page in accordance with one of the generated plurality of memory access requests, and because of at least one of the tags, again accessing the memory page in accordance with another of the generated plurality of memory access requests before closing the memory page; and wherein the memory access requests comprise a sequence of linear byte accesses.

11. A system, comprising:

a codec to (i) request information associated with an image macroblock from a memory unit and (ii) generate image information;

a translator to generate a plurality of memory access requests in response to the request from the processing unit;

a tagging unit to tag each of the plurality of generated memory access requests to associate the memory access requests with each other after generation of the plurality of memory access requests;

wherein said tag each of the plurality of generated memory access requests to associate the memory access requests with each other after generation of the plurality of memory access requests comprises generate a tag after said generation of the plurality of memory access requests, the tag communicating an origin and a type of memory traffic associated with the memory access requests;

at least one arbitration engine to receive the tag and arbitrate the plurality of generated memory access requests along with additional memory access requests in accordance with the tags, wherein at least some of the additional memory access requests do not have a tag;

wherein said arbitrate includes arrange for:

opening a dynamic random access memory page, accessing the memory page in accordance with one of the generated plurality of memory access requests, and because of at least one of the tags, again accessing the memory page in accordance with another of the generated plurality of memory access requests before closing the memory page; and a digital output to provide a digital signal, associated with the image information, to a digital display device;

wherein the plurality of generated memory access requests comprise a sequence of linear byte accesses.

12. The system of claim 11, wherein the system is associated with at least one of (i) a digital display device, (ii) a television, (iii) a digital video recorder, (iv) a game device, (v) a personal computer, (vi) a wireless device, or (vii) a set-top box.

* * * * *